US010852907B2

(12) United States Patent
So et al.

(10) Patent No.: US 10,852,907 B2
(45) Date of Patent: Dec. 1, 2020

(54) DISPLAY APPARATUS AND CONTROLLING METHOD THEREOF

(71) Applicant: SAMSUNG ELECTRONICS CO., LTD., Suwon-si (KR)

(72) Inventors: Yong-jin So, Seongnam-si (KR); Jung-geun Kim, Suwon-si (KR); Ji-hyae Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 14/855,518

(22) Filed: Sep. 16, 2015

(65) Prior Publication Data
US 2016/0092072 A1 Mar. 31, 2016

(30) Foreign Application Priority Data

Sep. 30, 2014 (KR) .................. 10-2014-0131639
May 29, 2015 (KR) .................. 10-2015-0075898

(51) Int. Cl.
*G06F 3/0481* (2013.01)
*G06F 3/0484* (2013.01)
*G06F 3/0486* (2013.01)
*G06F 3/0488* (2013.01)
*G06F 3/16* (2006.01)

(52) U.S. Cl.
CPC ........ *G06F 3/04817* (2013.01); *G06F 3/0486* (2013.01); *G06F 3/04812* (2013.01); *G06F 3/04842* (2013.01); *G06F 3/04883* (2013.01); *G06F 3/165* (2013.01)

(58) Field of Classification Search
CPC ............ G06F 3/04812; G06F 3/04817; G06F 3/04883; G06F 3/0486
See application file for complete search history.

(56) References Cited

U.S. PATENT DOCUMENTS 6,545,669 B1 * 4/2003 Kinawi ................ G06F 3/0486
345/1.1
7,571,014 B1 8/2009 Lambourne et al.
(Continued)

FOREIGN PATENT DOCUMENTS

CN   102891657 A   1/2013
CN   102937886 A   2/2013
(Continued)

OTHER PUBLICATIONS

International Search Report (PCT/ISA/210) dated Dec. 17, 2015 issued by International Searching Authority in International Application No. PCT/KR2015/009408.
(Continued)

*Primary Examiner* — Alexander Eisen
*Assistant Examiner* — Nathaniel P Brittingham
(74) *Attorney, Agent, or Firm* — Sughrue Mion, PLLC

(57) ABSTRACT

A display apparatus includes a display configured to display a plurality of graphical user interfaces (GUIs) corresponding to a plurality of speakers; a communicator configured to communicate with the plurality of speakers; and a processor configured to control a content output in at least one speaker of the plurality of speakers to be output in another speaker according to a touch interaction with respect to at least one GUI of the plurality of GUIs.

18 Claims, 18 Drawing Sheets

(56) References Cited

U.S. PATENT DOCUMENTS

| | | | |
|---|---|---|---|
| 8,423,893 B2* | 4/2013 | Ramsay | G06F 3/0486 |
| | | | 715/716 |
| 8,483,853 B1* | 7/2013 | Lambourne | H04R 3/12 |
| | | | 700/94 |
| 9,325,781 B2* | 4/2016 | Jung | H04N 1/00137 |
| 10,051,364 B2* | 8/2018 | Kim | G06F 3/04847 |
| 2007/0146347 A1* | 6/2007 | Rosenberg | G06F 3/04883 |
| | | | 345/173 |
| 2008/0229208 A1* | 9/2008 | Sahashi | G06F 3/0486 |
| | | | 715/736 |
| 2008/0253592 A1* | 10/2008 | Sanders | H04S 7/40 |
| | | | 381/306 |
| 2010/0138763 A1* | 6/2010 | Kim | G06F 3/04817 |
| | | | 715/765 |
| 2010/0299639 A1* | 11/2010 | Ramsay | G06F 3/0486 |
| | | | 715/835 |
| 2011/0029934 A1 | 2/2011 | Locker et al. | |
| 2011/0271186 A1 | 11/2011 | Owens | |
| 2011/0289412 A1* | 11/2011 | Sokol | H04N 7/17318 |
| | | | 715/720 |
| 2012/0066602 A1* | 3/2012 | Chai | G06F 3/04817 |
| | | | 715/733 |
| 2012/0226736 A1* | 9/2012 | Falchuk | G06F 9/5061 |
| | | | 709/203 |
| 2012/0254793 A1* | 10/2012 | Briand | G06F 3/048 |
| | | | 715/800 |
| 2012/0269361 A1* | 10/2012 | Bhow | H04N 21/25891 |
| | | | 381/81 |
| 2013/0024018 A1 | 1/2013 | Chang et al. | |
| 2013/0076651 A1 | 3/2013 | Reimann et al. | |
| 2013/0080955 A1 | 3/2013 | Reimann et al. | |
| 2013/0246916 A1* | 9/2013 | Reimann | H04N 21/43615 |
| | | | 715/716 |
| 2013/0275901 A1* | 10/2013 | Saas | G06F 3/0486 |
| | | | 715/769 |
| 2013/0283161 A1* | 10/2013 | Reimann | G06F 3/0486 |
| | | | 715/716 |
| 2013/0290888 A1* | 10/2013 | Reimann | G06F 3/0486 |
| | | | 715/769 |
| 2013/0343568 A1* | 12/2013 | Mayman | G06F 1/1632 |
| | | | 381/77 |
| 2014/0040803 A1* | 2/2014 | Briand | G06F 3/0486 |
| | | | 715/769 |
| 2014/0149901 A1* | 5/2014 | Hunter | H04L 12/282 |
| | | | 715/765 |
| 2014/0173461 A1* | 6/2014 | Shahade | H04L 65/403 |
| | | | 715/753 |
| 2014/0219483 A1 | 8/2014 | Hong | |
| 2014/0270235 A1 | 9/2014 | Shin et al. | |
| 2014/0310597 A1* | 10/2014 | Triplett | H04L 12/28 |
| | | | 715/716 |
| 2014/0331149 A1* | 11/2014 | Labey | H04M 1/72544 |
| | | | 715/757 |
| 2015/0256957 A1* | 9/2015 | Kim | H04R 3/12 |
| | | | 381/303 |
| 2015/0261410 A1* | 9/2015 | Kumar | G06F 3/04817 |
| | | | 715/716 |
| 2016/0004405 A1* | 1/2016 | Kim | G06F 3/04847 |
| | | | 715/727 |
| 2016/0004499 A1* | 1/2016 | Kim | G06F 3/04847 |
| | | | 715/716 |
| 2016/0026428 A1* | 1/2016 | Morganstern | G06F 3/165 |
| | | | 700/94 |
| 2016/0048310 A1* | 2/2016 | Patil | G06F 3/0486 |
| | | | 715/716 |
| 2016/0253145 A1* | 9/2016 | Lee | G06F 3/04883 |
| | | | 381/79 |
| 2017/0068507 A1* | 3/2017 | Kim | G06F 3/14 |
| 2017/0195819 A1* | 7/2017 | Harder | H04S 3/008 |

FOREIGN PATENT DOCUMENTS

| | | |
|---|---|---|
| CN | 103593127 A | 2/2014 |
| CN | 105308902 A | 2/2016 |
| WO | 2009/086599 A1 | 7/2009 |
| WO | 2012/030562 A1 | 3/2012 |
| WO | 2014/172417 A1 | 10/2014 |

OTHER PUBLICATIONS

Written Opinion (PCT/ISA/237) dated Dec. 17, 2015 issued by International Searching Authority in International Application No. PCT/KR2015/009408.
Communication dated Feb. 4, 2016 issued by European Patent Office in European Patent Application No. 15186532.6.
Communication dated Jan. 17, 2018 by the State Intellectual Property Office of P.R. China in counterpart Chinese Patent Application No. 201510640020.X.
Communication dated Apr. 13, 2018, issued by the European Patent Office in counterpart European Patent Application No. 15186532.6.
Communication dated Jul. 6, 2018, issued by the State Intellectual Property Office of P.R. China in counterpart Chinese Application No. 201510640020.X.
Communication dated Dec. 17, 2018, issued by the European Patent Office in counterpart European Application No. 15186532.6.
Communication dated Jun. 4, 2019, issued by the European Patent Office in counterpart European Application No. 15186532.6.
Communication dated Jul. 3, 2019, issued by the European Patent Office in counterpart European Application No. 15186532.6.

* cited by examiner

DISPLAY APPARATUS AND CONTROLLING METHOD THEREOF

CROSS-REFERENCE TO RELATED APPLICATIONS

This application claims priority from Korean Patent Application No. 10-2014-0131639, filed in the Korean Intellectual Property Office on Sep. 30, 2014, and Korean Patent Application No. 10-2015-0075898, filed in the Korean Intellectual Property Office on May 29, 2015, the disclosures of which are incorporated herein by reference in their entireties.

BACKGROUND

1. Field

Aspects of one or more exemplary embodiments relate to a display apparatus and a controlling method thereof, and more particularly, to a display apparatus which controls a plurality of speakers and a controlling method thereof.

2. Description of the Related Art

With the development of electronic technologies, various types of electronic products have been developed and distributed, and such electronic apparatuses with various types of communication functions have been widely used in general households. Further, a communication function has been provided to an electronic product which did not have a communication function previously.

In particular, a speaker used to require connection to a main system via cable to output contents, but more recently, speakers may receive and output contents wirelessly. In addition, a speaker may receive not only contents but also a control signal wirelessly and operate accordingly. As a speaker is provided at a reasonable price, even general users may have a plurality of speakers in a household, and each of the speakers may be used individually or may be connected to a single main system.

Accordingly, a display apparatus and an application to control a plurality of speakers have been developed. A related art application provides information regarding a plurality of speakers in a list, showing merely the operation state of the speakers or providing a simple control function.

Specifically, it may be difficult to check the operation state of a plurality of speakers at a glance. In addition, each speaker should be controlled individually in order for a plurality of speakers to be controlled, and there is no interaction function between the speakers. For example, in order to output a content which is output in one speaker through another speaker, a new cable connection is required or the corresponding speaker needs to be controlled directly to output the specific content, which causes inconvenience.

SUMMARY

An aspect of the exemplary embodiments relates to a display apparatus which controls a content output in one of a plurality of speakers to be output in another speaker according to a touch interaction with respect to at least one of a plurality of Graphic User Interfaces (GUI) corresponding to each of the plurality of speakers and a controlling method thereof.

According to an aspect of an exemplary embodiment, there is provided a display apparatus, including: a display configured to display a plurality of graphical user interfaces (GUIs) corresponding to a plurality of speakers; a communicator configured to communicate with the plurality of speakers; and a processor configured to control a content output in at least one speaker of the plurality of speakers to be output in another speaker according to a touch interaction with respect to at least one GUI of the plurality of GUIs.

The processor, in response to a swipe interaction being input on the display, the swipe interaction beginning at a first location on the display of a first GUI corresponding to a first speaker, and the swipe interaction moving toward a second location on the display of a second GUI corresponding to a second speaker, may be configured to control a content output from the first speaker to be output from the second speaker.

In response to the swipe interaction, the processor may control the second GUI to display information that is displayed in the first GUI.

The processor, in response to a touch interaction for grouping being input on the display, the touch interaction for grouping beginning at a first location on the display of a first GUI corresponding to a first speaker and the touch interaction for grouping moving toward a second location on the display of a second GUI corresponding to a second speaker, may be configured to control to perform a grouping function of linking first output of the first speaker to second output of the second speaker.

The processor, in response to the touch interaction being input, may be configured to control the display to display a third GUI which provides a visual feedback indicating that the first GUI and the second GUI are connected.

The processor, in response to an interaction of moving at least one of the first GUI and the second GUI being input on the display while the first GUI and the second GUI are grouped, may be configured to control to release the grouping function, and to remove the third GUI.

The processor, in response to an interaction of dragging being input on the display, the interaction of dragging beginning at a first location of a first GUI corresponding to a first speaker and dropping the first GUI on a second location where a second GUI corresponding to a second speaker is displayed, may be configured to control to perform a stereo function where a plurality of channel signals constituting a content output from the second speaker are output from the first speaker and the second speaker, wherein the plurality of channel signals includes a first channel signal output from the first speaker and a second channel signal output from the second speaker.

The processor, in response to the drag and drop interaction being input on the display, may be configured to control the first GUI and the second GUI to be disposed adjacent to each other.

The processor, in response to a drag and drop interaction being input on the display, the drag and drop interaction including switching the first location of the first GUI with the second location of the second GUI, may be configured to control to switch the first channel signals output from the first speaker with the second channel signal output from the second speaker.

The processor, in response to an interaction of moving being input on the display, the interaction of moving causing the first GUI and the second GUI being spaced apart at more than a predetermined interval, may be configured to control to release the stereo function.

The processor, in response to an interaction to move at least one of a first GUI corresponding to a first speaker and a second GUI corresponding to a second speaker being input on the display, if a distance between the first GUI and the second GUI is less than a predetermined first threshold distance, may be configured to control the display to provide an animation effect to change a shape of the first GUI and the second GUI.

The first GUI may include a first information display area and a first edge area surrounding the first information display area and the second GUI includes a second information display area and a second edge area surrounding the second information display area, and the processor, if the distance between the first GUI and the second GUI is less than the predetermined first threshold distance, may provide a visual feedback that is the first edge area and the second edge area are extended in a direction toward a center point between the first GUI and the second GUI.

The processor, if the distance between the first GUI and the second GUI is less than a second threshold distance, may be configured to provide a visual feedback that the first edge is connected with the second edge area.

The processor, if the distance between the first GUI and the second GUI is less than a third threshold distance, may be configured to provide a visual feedback to replace the first edge area and the second edge area with a combined edge area, and to replace the first information display area and the second information display area with a combined information display area surrounding the first GUI and the second GUI.

Each of the plurality of GUIs may include information regarding a content output from a corresponding speaker.

The processor, in response to a touch interaction being input on the display, the touch interaction corresponding to at least one GUI of the plurality of GUIs, may be configured to control to provide a predetermined feedback from a speaker corresponding to the at least one GUI.

According to another aspect of an exemplary embodiment, there is provided a method of controlling a display apparatus which communicates with a plurality of speakers, including displaying on a display a plurality of GUIs corresponding to a plurality of speakers; and in response to receiving a touch interaction with respect to at least one of the plurality of GUIs, controlling a content output in a first speaker of the plurality of speakers to be output in a second speaker of the plurality of speakers.

The controlling may include, in response to receiving a swipe interaction, the swipe interaction beginning at a first location on the display corresponding to a first GUI corresponding to the first speaker, and the swipe interaction moving toward a second location of a second GUI corresponding to the second speaker, controlling a content output in the first speaker to be output in the second speaker.

The method may include, in response to receiving the swipe interaction, displaying information in the second GUI, the information being displayed in the first GUI.

The controlling may include, in response to a touch interaction for grouping being received on the display, the touch interaction for grouping beginning from a first location of first GUI corresponding to a first speaker, and the touch interaction for grouping moving to a second location of a second GUI corresponding to a second speaker being, controlling to perform a grouping function linking first output of the first speaker with second output of the second speaker.

According to yet another aspect of an exemplary embodiment, there is provided a method including displaying, on a display, a plurality of icons, the plurality of icons including a first icon and a second icon; associating the first icon with a first speaker of the plurality of speaker, and the second icon with a second speaker of the plurality of speakers;

receiving, at the display, an input from a user corresponding to at least one from among the first icon and the second icon; and controlling at least one from among the first output of the first speaker and the second output of the second speaker based on the input.

The input may be a swipe input that moves the first icon toward the second icon, and controlling at least one from among the first output of the first speaker and the second output of the second speaker based on the input may include controlling the second speaker to output the first output.

The input may be a grouping input that establishes a group including the first icon and the second icon, and controlling at least one from among the first output of the first speaker and the second output of the second speaker based on the input may include controlling the first output and the second output to be linked.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION

Figure 1:
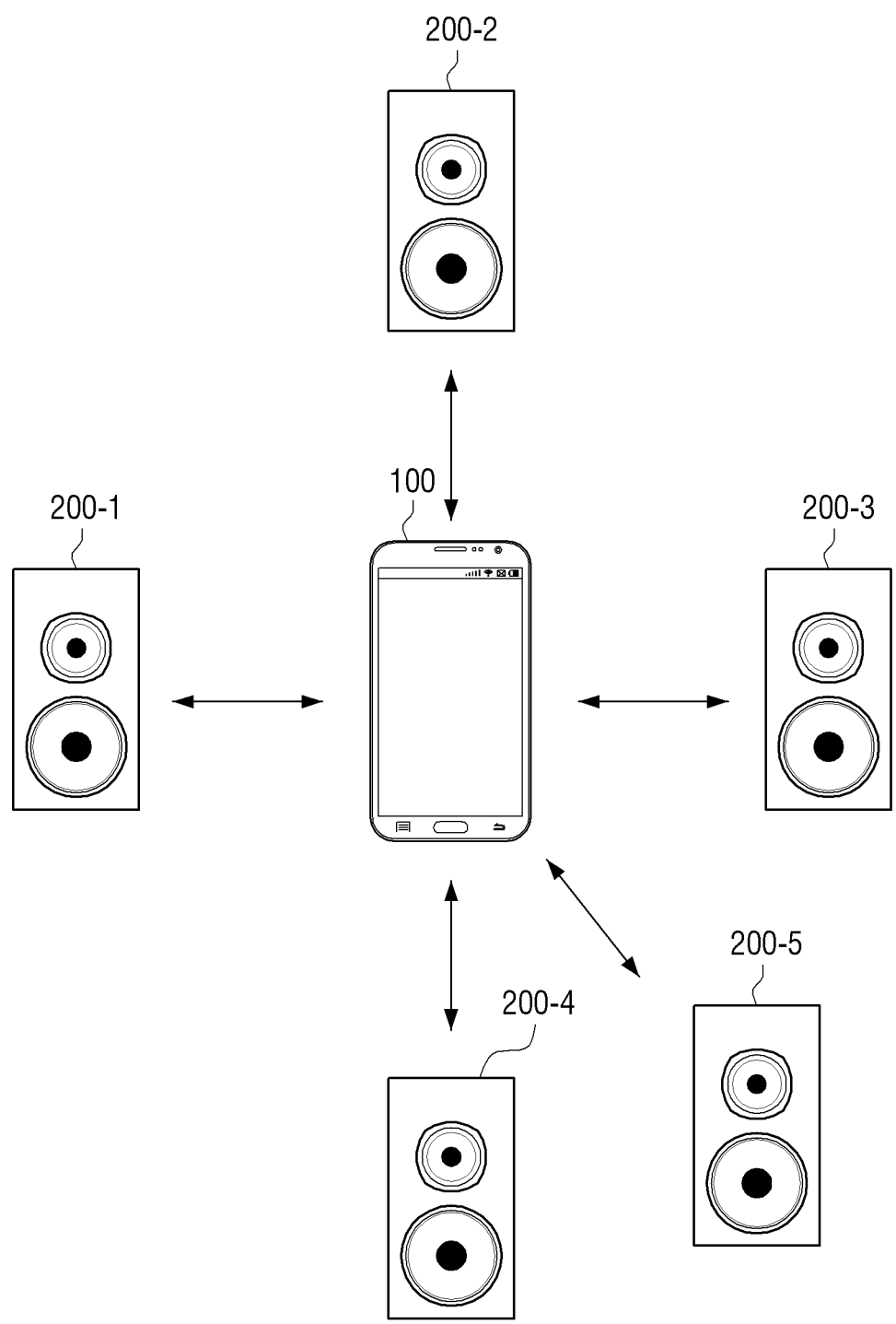
FIG. 1 is a view illustrating a multi speaker system according to an exemplary embodiment.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they could obscure the disclosure with unnecessary detail.

Certain exemplary embodiments are described in greater detail below with reference to the accompanying drawings.

FIG. 1 is a view illustrating a multi speaker system 10 according to an exemplary embodiment. As illustrated in FIG. 1, the multi speaker system 10 includes a display apparatus 100 and a plurality of speakers 200-1 through 200-5.

The display apparatus 100 may communicate with the plurality of speakers 200-1 through 200-5. In particular, the display apparatus 100 may receive characteristics information regarding each speaker and information regarding contents which are output from each speaker from the plurality of speakers 200-1 through 200-5. The characteristics information regarding each speaker may be various information such as information regarding the type and location of the speakers. In addition, the display apparatus 100 transmits a signal to control each speaker to the plurality of speakers 200-1 through 200-5.

The display apparatus 100 may display a plurality of Graphical User Interfaces (GUI) corresponding to each of the plurality of speakers based on the characteristics information of the speakers. In addition, the display apparatus 100 may include and display information regarding contents which are output through each speaker. For example, the information regarding contents may be an album cover of a song which is being output, and the display apparatus 100 may overlap and display the album cover with a GUI corresponding to a speaker through which the song is output. However, the information regarding contents are not limited thereto, and the display apparatus 100 may change a GUI itself and display the changed GUI.

The display apparatus may control a content which is output through one of a plurality of speakers through another speaker according to a touch interaction with respect to at least one of a plurality of GUIs. For example, if a touch interaction input of moving the first GUI corresponding to the first speaker in such a way that the first GUI overlaps with the second GUI corresponding to the second speaker is received, the display apparatus 100 may control a content that is output through the first speaker to be output through the second speaker.

The plurality of speakers 200-1 through 200-5 may perform communication with the display apparatus 100. In particular, the plurality of speakers 200-1 through 200-5 may transmit characteristics information regarding each speaker and information regarding contents which are output through each speaker to the display apparatus 100. In addition, the plurality of speakers 200-1 through 200-5 may receive a control signal to control each speaker from the display apparatus 100.

The plurality of speakers 200-1 through 200-5 receive and output contents based on the received control signal. For example, the speakers may receive and output contents from the display apparatus 100 or from other electronic apparatuses.

As described above, a plurality of GUIs corresponding to each of the plurality of speakers 200-1 through 200-5 are displayed through the display apparatus 100, and the plurality of speakers 200-1 through 200-5 are controlled according to a touch interaction with respect to the plurality of GUIs. Accordingly, a user may overcome spatial constraints and control the plurality of speakers 200-1 through 200-5 more efficiently and rapidly.

FIG. 2 is a block diagram illustrating an example configuration of the display apparatus 100 according to an exemplary embodiment.

Figure 2A:
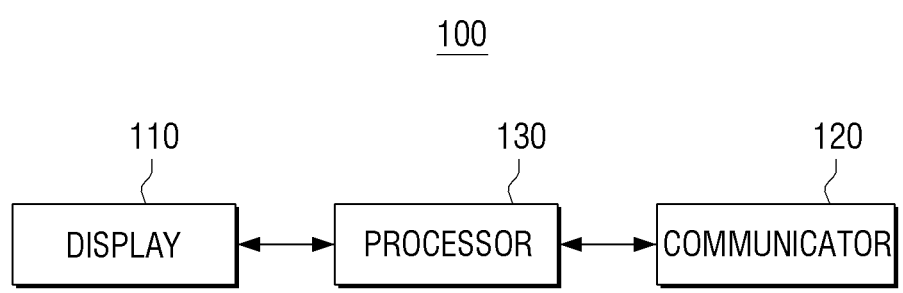
FIGS. 2A-2B are block diagrams illustrating configurations of a display apparatus according to exemplary embodiments.

Referring to FIG. 2A, the display apparatus 100 includes a display 110, a communicator 120, and a processor 130, which can be a controller.

Meanwhile, FIG. 2A illustrates various elements comprehensively by taking as an example the display apparatus 100 which includes various functions such as a display function, a communication function, a storage function, etc. Accordingly, depending on exemplary embodiments, some elements illustrated in FIG. 2A may be omitted or changed, or other elements may be added.

The display 110 displays a plurality of GUIs corresponding to each of the plurality of speakers 200-1 through 200-5 under the control of the processor 130. In particular, the display 110 may include and display information regarding contents which are output through the speakers in addition to the plurality of GUIs. For example, the display 110 may overlap and display a song title which is information corresponding to a content with a GUI, but this is only an example. The information regarding contents may be displayed separately from a GUI.

In addition, the display 110 may be realized as Liquid Crystal Display Panel (LCD), Organic Light Emitting Diodes (OLED), etc. but is not limited thereto. In addition, the display 110 may be realized as a flexible display, a transparent display, etc. in some cases.

The communicator 120 performs communication with the plurality of speakers 200-1 through 200-5.

Specifically, the communicator 120 may receive characteristics information regarding each speaker and information regarding contents which are output through each speaker from the plurality of speakers 200-1 through 200-5. For example, the information the manufacturer, model name, and location information of the speakers.

Meanwhile, the communicator 120 may perform unilateral or bilateral communication with respect to the plurality of speakers 200-1 through 200-5. When unilateral communication is performed, the communicator 120 may receive a signal from the plurality of speakers 200-1 through 200-5. When bilateral communication is performed, the communicator 120 may receive a signal from the plurality of speakers 200-1 through 200-5, and may also transmit a signal to the plurality of speakers 200-1 through 200-5.

The processor 130 may control a content which is output through one of a plurality of speakers to be output through another speaker according to a touch interaction with respect to at least one of a plurality of GUIs.

In addition, if a swipe interaction is input in the direction of the second GUI corresponding to the second speaker from the first GUI corresponding to the first speaker, the processor 130 may control a content which is output through the first speaker to be output through the second speaker.

Further, the processor 130 may display information displayed on the first GUI on the second GUI according to a swipe interaction.

If a touch interaction for grouping from the first GUI corresponding to the first speaker to the second GUI corresponding to the second speaker is input, the processor 130 may control to perform the grouping function of associating the output of the first speaker with the output of the second speaker.

If a touch interaction is input, the processor 130 may display a third GUI which provides a visual feedback indicating that the first GUI and the second GUI are connected to each other.

If an interaction of moving at least one of the first GUI and the second GUI while the first GUI and the second GUI are grouped, the processor 130 may control to release the grouping function and remove the third GUI.

If an interaction of dragging the first GUI corresponding to the first speaker and dropping the first GUI at the location where the second GUI corresponding to the second speaker is displayed is input, the processor 130 may control to perform a stereo function where a plurality of channel signals constituting a content which is output from the second speaker are output through the first speaker and the second speaker, respectively.

In addition, if a drag-and-drop interaction is input, the processor 130 may dispose the first GUI and the second GUI to be adjacent to each other.

If a drag-and-drop interaction of exchanging the locations of the first GUI and the second GUI is input, the processor 130 may control to switch channel signals output from the first speaker and the second speaker and output the signals.

In addition, if the first GUI and the second GUI are spaced apart at more than a predetermined distance according to an interaction of moving at least one of the first GUI and the second GUI, the processor 130 may control to release the stereo function.

The processor 130, according to an interaction to move at least one of a first GUI corresponding to a first speaker and a second GUI corresponding to a second speaker, if distance between the first GUI and the second GUI is less than a predetermined first threshold distance, may provide an animation effect to change a shape of the first GUI and the second GUI.

In addition, each of the first GUI and the second GUI comprises information display area and an edge area surrounding the information display area, wherein the processor 130, if distance between the first GUI and the second GUI is less than a predetermined first threshold distance, may provide a visual feedback that an edge area of each of the first GUI and the second GUI is extended in a direction toward one area between the first GUI and the second GUI.

The processor 130, if distance between the first GUI and the second GUI is less than a second threshold distance, may provide a visual feedback that the extended edge areas are connected with each other.

The processor 130, if distance between the first GUI and the second GUI is less than a third threshold distance, may provide a visual feedback to surround information display area of each of the first GUI and the second GUI while the edge areas are united to one area.

The processor 130 may control to display information regarding contents which are output from speakers corresponding to each of a plurality of GUIs.

If a touch interaction with respect to at least one of a plurality of GUIs is input, the processor 130 may control to provide a predetermined feedback from a speaker corresponding to the GUI where the touch interaction is input.

Figure 2B:
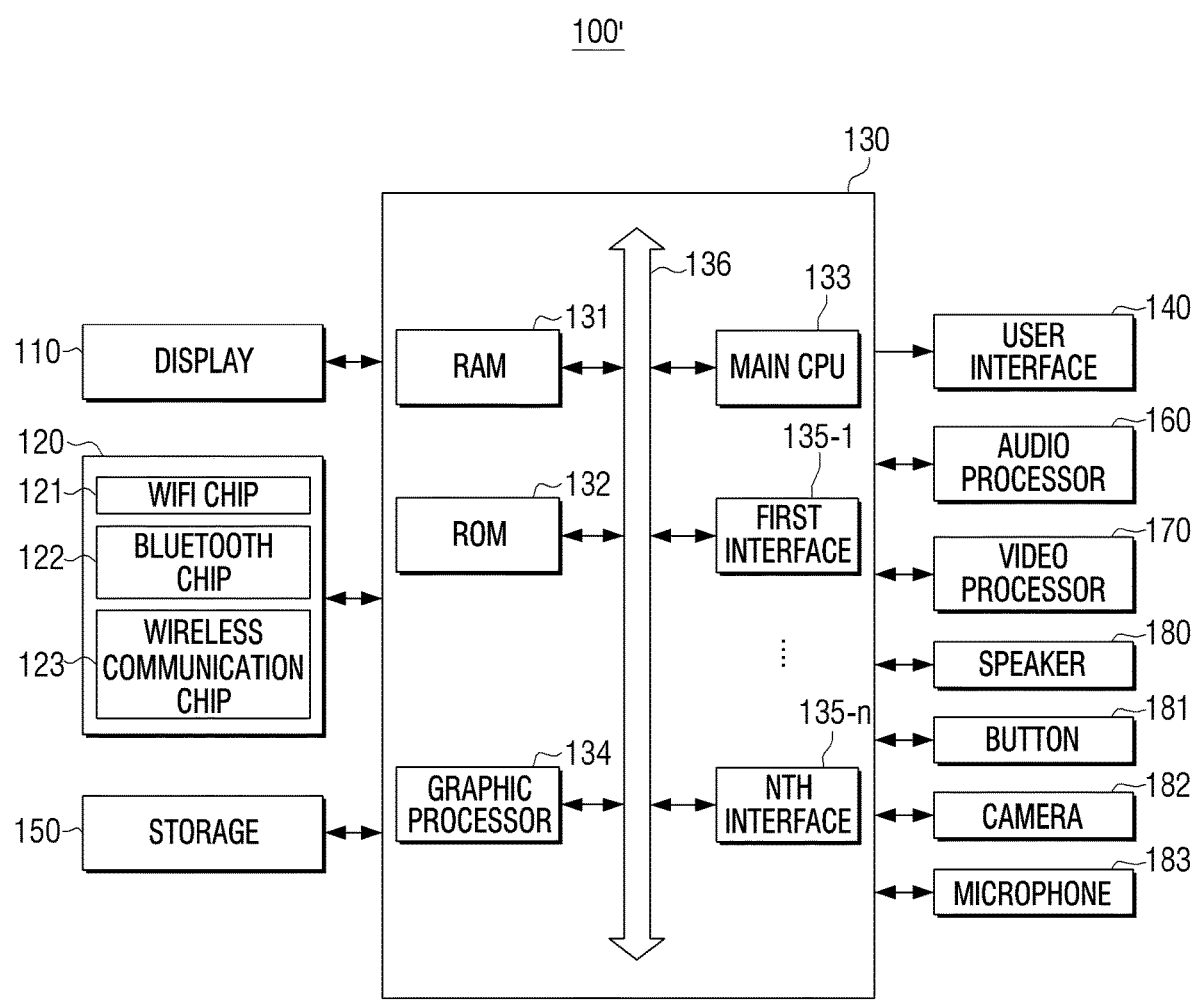

FIG. 2B is a block diagram illustrating detailed configuration of a display apparatus 100' according to another exemplary embodiment. Referring to FIG. 2B, the display apparatus 100' includes the display 110, the communicator 120, the processor 130, a user interface 140, a storage 150, an audio processor 160, a video processor 170, a speaker 180, a button 181, a camera 182, and a microphone 183. The detailed description regarding the elements of FIG. 2B which are overlapped with those in FIG. 2A will not be provided. It should be understood that display apparatus 100 and display apparatus 100' are not limited to the elements described herein, and that in some exemplary embodiments, one or more of the elements of display apparatus 100 and display apparatus 100' described above or below may be omitted.

The processor 130 controls overall operations of the display apparatus 100 using various programs stored in the storage 150.

Specifically, the processor 130 includes a RAM 131, a ROM 132, a main CPU 133, a graphic processor 134, first to nth interface 135-1 through 135-n, and a bus 136.

The RAM 131, the ROM 132, the main CPU 133, the graphic processor 134, the first to the nth interface 135-1 through 135-n, etc. may be interconnected through the bus 136.

The first to the nth interface (135-1 to 135-n) are connected to the above-described various elements. One of the interface may be network interface which is connected to an external apparatus via network.

The main CPU 133 accesses the storage 150, and performs booting using an Operating System (O/S) stored in the storage 150. In addition, the main CPU 133 performs various operations using various programs, contents, data, etc. stored in the storage 150.

The ROM 132 stores a set of commands for system booting. If a turn-on command is input and thus, power is supplied, the main CPU 133 copies O/S stored in the storage 150 in the RAM 131 according to a command stored in the ROM 132, and boots a system by executing the O/S. When the booting is completed, the main CPU 133 copies various application programs stored in the storage 150 in the RAM 131, and executes the application programs copied in the RAM 131 to perform various operations.

The graphic processor 134 generates a screen including various objects such as an icon, an image, a text, etc. using a computing unit and a rendering unit. The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the display 110.

Meanwhile, the operations of the above-described processor 130 may be performed by a program stored in the storage 150.

The storage 150 stores various data such as an O/S software module, various GUI information, various control information, etc. to drive the display apparatus 100.

In this case, the processor 130 may display a plurality of GUIs corresponding to each of the plurality of speakers 200-1 through 200-5 based on information stored in the storage 150.

The user interface unit 140 receives various user interactions. If the display apparatus 100 is realized as a touch-based mobile terminal, the user interface unit 140 may be realized in the form of touch screen which forms an interlayer structure with respect to a touch pad. In this case, the user interface 140 may be used as the above-described display 110.

A detector includes a touch sensor, a geomagnetic sensor, a gyro sensor, an acceleration sensor, a proximity sensor, a grip sensor, etc. The detector may detect various manipulations such as rotation, tilt, pressure, approach, grip, etc. in addition to the above-described touch.

The touch sensor may be realized as capacitive or resistive sensor. The capacitive sensor calculates a touch coordinates by sensing micro-electricity excited by a user body when part of the user body touches the surface of a display using a dielectric coated on the surface of the display. The resistive sensor includes two electrode plates built in the display apparatus 100, and calculates a touch coordinates as the upper and lower plates of the touched point contact with each other to sense flowing electric current when a user touches a screen. In addition, a infrared detecting method, a surface acoustic wave method, an integral strain gauge method, a piezo effect method, etc. may be used to detect a touch interaction.

In addition, the display apparatus 100 may determine whether there is contact or proximity of a touch object such as a finger or a stylus pen using a magnetic, a magnetic field sensor, an optical sensor, a proximity sensor, etc. instead of a touch sensor.

The geomagnetic sensor detects the rotation state, the direction of motion, etc. of the display apparatus 100. The gyro sensor detects the rotation angle of the display apparatus 100. The display apparatus 100 may include both the geomagnetic sensor and the gyro sensor, but the display apparatus 100 may detect the rotation state only with one of them.

The acceleration sensor detects the degree of tilt of the display apparatus 100.

The proximity sensor detects a motion which is approaching a display surface without actually contacting the surface. The proximity sensor may be realized as various types of sensors such as inductive proximity sensor which detects an electric current induced by magnetic field properties which change when an object approaches by forming a high frequency magnetic field, a magnetic proximity sensor which uses a magnet, and a capacitive proximity sensor which detects capacitance which changes as an object approaches.

The grip sensor is disposed on the rear side, border, or handle of the display apparatus 100 separately from a touch sensor provided on a touch screen, and detects a user's grip. The grip sensor may be realized as a pressure sensor other than a touch sensor.

The audio processor 160 performs processing with respect to audio data. The audio processor 150 may perform various processing such as decoding, amplification, noise filtering, etc. with respect to audio data.

The video processor 170 performs processing with respect to video data. The video processor 170 may perform various image processing such as decoding, scaling, noise filtering, frame rate conversion, resolution conversion, etc. with respect to video data.

The speaker 180 outputs not only various audio data processed by the audio processor 160 but also various alarm sounds or voice messages, etc.

The button 181 may be realized as various types of buttons such as a mechanical button, a touch pad, a wheel, etc. which are formed on the front, side, or rear of the exterior of a main body.

The camera 182 photographs a still image or a moving image according to a user's control. The camera 182 may be realized as a plurality of cameras such as a front camera, a rear camera, etc. The microphone 183 receives a user voice or other sounds and converts the same into audio data.

Hereinafter, a basic configuration and various exemplary embodiments will be described for better understanding.

Figure 3:
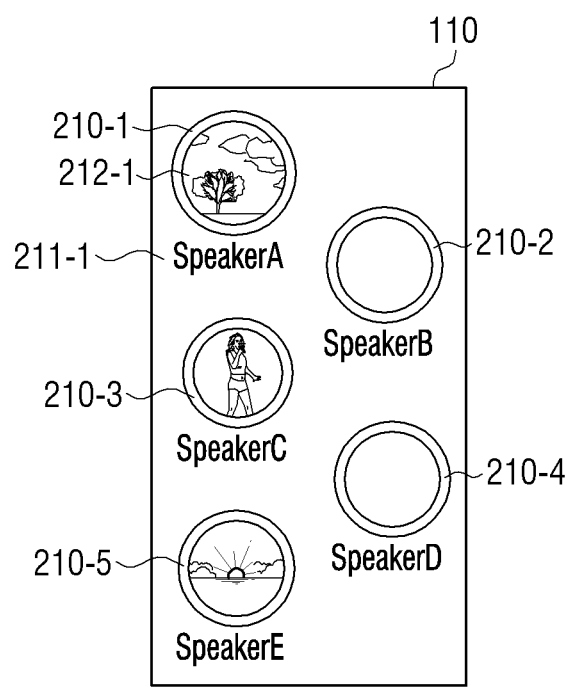
FIG. 3 is a screen which displays a GUI according to an exemplary embodiment.

FIG. 3 is a screen which displays a GUI according to an exemplary embodiment.

Referring to FIG. 3, the processor 130 performs communication with the plurality of speakers 200-1 through 200-5. The processor 130 may display a plurality of GUIs 210-1 through 210-5 corresponding to each of the plurality of speakers 200-1 through 200-5 based on information received from the speakers. The plurality of GUIs 210-1 through 210-5 are represented in the form of a circle, but are not limited thereto. The plurality of GUIs 210-1 through 210-5 may be realized in the form of The processor 130 performs communication with the plurality of speakers 200-1 through 200-5. The processor 130 may display the plurality of GUIs 210-1 through 210-5 corresponding to each of the plurality of speakers 200-1 through 200-5. The plurality of GUIs 210-1 through 210-5 are provided in the form of circle, but are not limited thereto. The plurality of GUIs 210-1 through 210-5 may be provided in the form of triangle, square, etc. or in the form of a speaker or icon.

In addition, the processor 130 may display the name of speaker 211-1, "Speaker A", on the lower part of the GUI 210-1 corresponding to the speaker. The name of the speaker 211-1 may be set and displayed automatically by the processor 130, but the type of speaker, manufacturer, etc. may be displayed based on information received from the speaker. For example, the processor 130 may display the name 211-1 of speaker as "SAMSUNG" instead of "Speaker A".

In addition, the processor 130 may display information regarding the location of speaker instead of the name of the speaker. For example, the processor 130 may display the name of speaker as "living room speaker", "kitchen speaker", etc. instead of "Speaker A", but are not limited thereto, and the name of speaker 211-1 may be set by a user.

The processor 130 may also include information regarding a content output from a speaker in a corresponding GUI and display the information. In the case of "Speaker A", the processor 130 may overlap and display a song album cover 212-2 with the first GUI 210-1 as information regarding a content output from the speaker. However, the information regarding a content which is being output is not limited to a song album cover. For example, TV drama information, movie poster information, etc. may be displayed as information corresponding to a content which is being output, and the information may be displayed in the form of text instead of thumbnail.

If no content is output from a speaker, the processor 130 may not display any information, as can be seen for example on the GUIs 210-2, 210-4. However, this is only an example, the processor 130 may display information regarding a content which has been output from the speaker previously. In this case, the processor 130 may display information regarding a content which is currently not output in black and white in order to distinguish a GUI corresponding to the speaker which does not output a content currently from a GUI corresponding to a speaker which outputs a content currently. However, this is only an example, the processor 130 may decrease the chroma or brightness or increase the transparency of information regarding a content which is currently not output and display the information.

In the above description, the feature of displaying the plurality of GUIs 210-1 through 210-5 of the display apparatus 100 has been explained. Hereinafter, an exemplary embodiment of controlling the plurality of speakers 200-1 through 200-5 by manipulating the plurality of GUIs 210-1 through 210-5 will be explained below.

Figure 4:
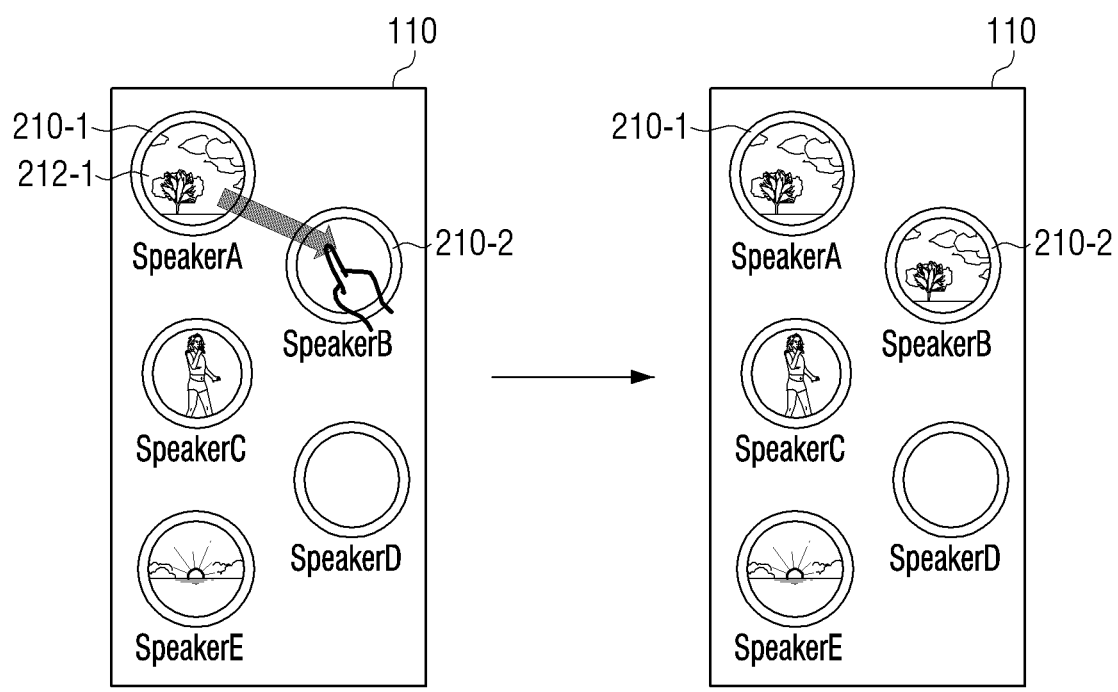
FIG. 4 is a view provided to explain controlling of a speaker with respect to a swipe interaction according to an exemplary embodiment.

FIG. 4 is a view provided to explain controlling of a speaker with respect to a swipe interaction according to an exemplary embodiment.

Referring to FIG. 4, if a swipe interaction in the direction of the second GUI 210-2 corresponding to the second speaker 200-2 from the direction of the first GUI 210-1 corresponding to the first speaker 200-1 is input, the processor 130 may control a content output from the first speaker 200-1 to be output from the second speaker 200-2.

The swipe interaction refers to an interaction of touching a specific point with a finger and touching in a specific direction continuously without removing the finger. In a touch interaction for grouping, which will be described later, the touch interaction continues until it reaches the second GUI 210-2, but in the swipe interaction, a touch interaction ends before it reaches the second GUI 210-2.

The processor 130 may control the second speaker 200-2 to output a content which is output from the first speaker 200-1 in response to the above-described swipe interaction. For example, the first speaker 200-1 may be connected to a digital TV wirelessly, and the processor 130 may receive information from the first speaker 200-1 that it is outputting a content of a digital TV. In this case, if a user's swipe interaction is input based on such information, the processor 130 may transmit a control signal to the second speaker 200-2 so that the second speaker 200-2 may output the content of the digital TV. However, this is only an example, and the processor 130 may transmit to the second speaker 200-2 a control signal to output the content which is output from the first speaker 200-1, and through communication between speakers, the second speaker 200-2 may directly receive information on the content which is output from the first speaker 200-1 and output the content.

Meanwhile, information 212-1 regarding a content output from the first speaker 200-1, which is overlapped and displayed with the first GUI 210-1 may be moved according to a location corresponding to a user's touch point based on a swipe interaction. However, this is only an example, and the first GUI 120-1 may be configured to be moved, or nothing may be moved.

If a swipe interaction does not continue for more than a predetermined distance, the content output from the first speaker 200-1 may not be output from the second speaker 200-2, and the information 212-1 regarding the content which is output may be moved to a location corresponding to a user's touch point according to the swipe interaction and then, be returned to its original location on the first GUI 210-1 and displayed.

Meanwhile, if the content output from the first speaker 200-1 is output from the second speaker 200-2 according to a swipe interaction, the processor 130 may display information regarding the content, which has been overlapped and displayed with the first GUI 210-1 on the second GUI 210-2.

Even if the same contents are output from the first speaker 200-1 and the second speaker 200-2 according to a swipe interaction, this is different from a grouping function which will be described later. In the case of the swipe interaction, if a control command to reproduce a new content through one of the first speaker 200-1 or the second speaker 200-2 is transmitted, the first speaker 200-1 and the second speaker 200-2 reproduce different contents. On the other hand, in the case of the grouping function, if a new content is to be reproduced through a speaker while a grouping function is set, the processor 130 transmits a control command to reproduce the new content through all speakers which are grouped together, which will be described later.

Figure 5A:
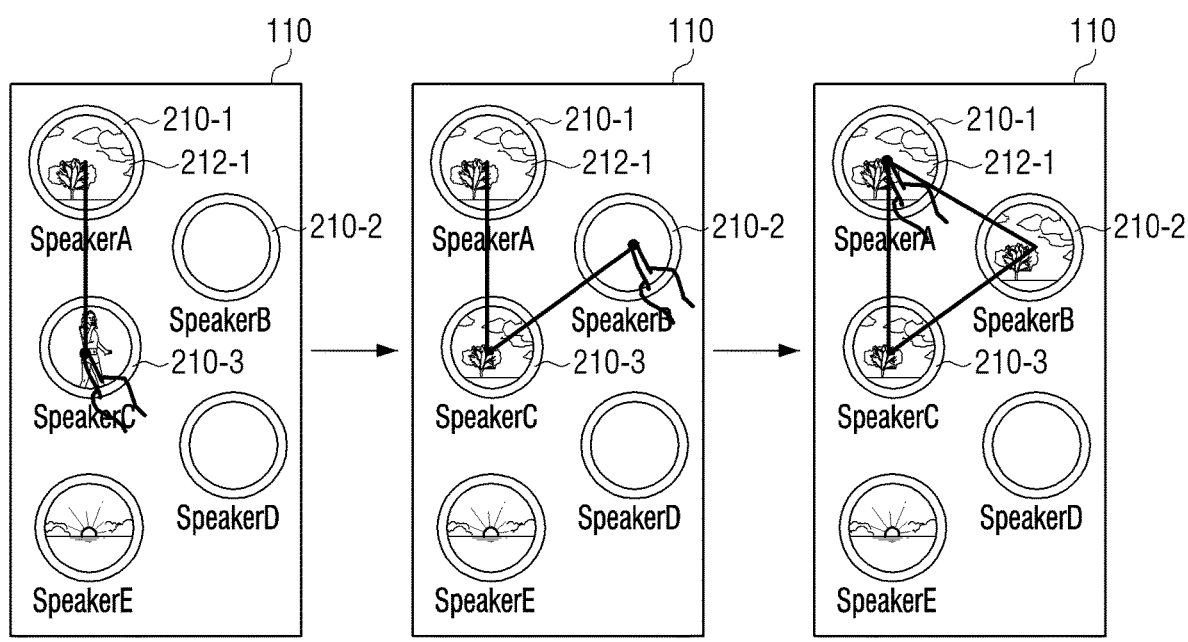
FIGS. 5A-5B are views provided to explain a grouping function according to various exemplary embodiments.
Figure 5B:
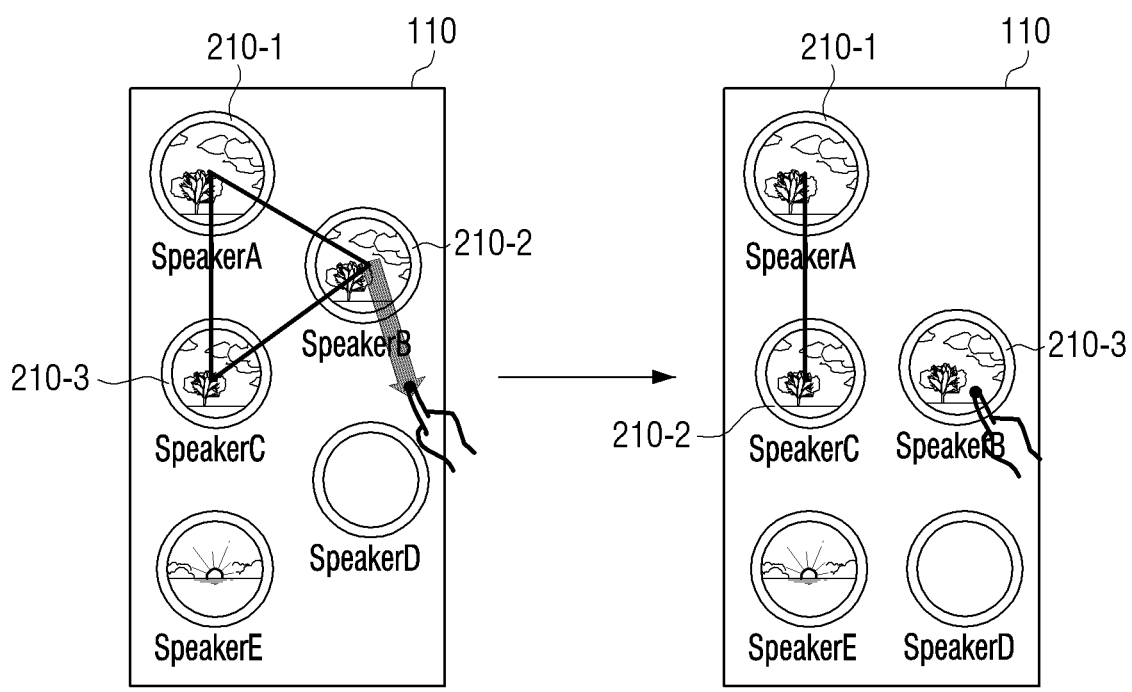

FIGS. 5A-5B are views provided to explain a grouping function according to various exemplary embodiments.

FIG. 5A is a view provided to explain setting of a grouping function according to an exemplary embodiment. Referring to FIG. 5A, a user may input a touch interaction for grouping GUIs from the first GUI 210-1 corresponding to the first speaker 200-1, going through the third GUI 210-3 corresponding to the third speaker 200-3, to the second GUI 210-2 corresponding to the second speaker 200-2. Accordingly, the processor 130 may control to perform the grouping function of interlocking the output of the first speaker 200-1, the second speaker 200-2, and the third speaker 200-3.

The touch interaction for grouping is similar to the above-described swipe interaction, but there is a difference in that the touch interaction for grouping is performed continuously from the first GUI 210-1 which is touched first to a GUI corresponding to another speaker which is to be grouped together.

Even before a user's touch interaction for grouping reaches the second GUI 210-2, going through the third GUI 210-3, from the first GUI 210-1, the processor 130 may control to group the first speaker 200-1 and the third speaker 200-3. Accordingly, the processor 130 may control the information 212-1 regarding a content which is output from the first speaker 200-1 to be overlapped and displayed with the third GUI 210-3. In addition, the processor 130 may transmit a control signal to the third speaker 200-3 so that the content output from the first speaker 200-1 is output from the third speaker 200-3.

Meanwhile, if a user's touch interaction is going through the third GUI 210-3 and stops at the second GUI 210-2, the processor 130 may control to group the first speaker 200-1, the second speaker 200-2, and the third speaker 200-3. The processor 130 may also control the information 212-1 regarding a content output from the first speaker 200-1 to be overlapped and displayed with the second GUI 210-2 and the third GUI 210-3. Further, the processor 130 may transmit a control signal to the second speaker 200-2 and the third speaker 200-3 so that the content output from the first speaker 200-1 is output from the second speaker 200-2 and the third speaker 200-3.

Meanwhile, when a plurality of speakers are grouped together, the processor 130 may transmit the same control signal to the plurality of speakers. For example, if a content output from the first speaker 200-1 from among a plurality of speakers changes, the processor 130 may transmit a control signal so that the changed contents are output from the other speakers.

In addition, when a plurality of speakers are grouped together, the processor 130 may display a fourth GUI which provides a visual feedback showing that a plurality of GUIs corresponding to each of the plurality of speakers are connected. For example, the processor 130 may display a line which connects the centers of a plurality of GUIs corresponding to each of the grouped speakers. However, this is only an example, and the processor 130 may display plurality of GUIs corresponding to each of the grouped speakers to be adjacent to each other.

FIG. 5B is a view to release a grouping function according to another exemplary embodiment. Referring to FIG. 5B, if an interaction of moving at least one of the first GUI 210-1, the second GUI 210-2, and the third GUI 210-3 is input while the first GUI 210-1, the second GUI 210-2, and the third GUI 210-3 are grouped together, the processor 130 may control to release the grouping function and remove the fourth GUI.

If a line connecting the centers of a plurality of GUIs corresponding to each of the grouped speakers is displayed, an interaction of moving at least one of the plurality of GUIs may be an interaction of separating a GUI from the line connecting the plurality of GUIs by more than a predetermined distance. However, this is only an example, and if a plurality of GUIs corresponding to each of the grouped speakers are adjacent to each other, the interaction may be an interaction of separating at least one of the plurality of GUIs from the other GUIs.

Even a speaker corresponding to a GUI which is released from grouping may continue to output a content. That is, releasing from grouping does not mean that the contents output from a plurality of speakers change immediately. However, if a user inputs a touch interaction to output a different content through a speaker which is released from grouping, the processor 130 may control only the speaker which is released from grouping to output the different content.

Figure 6A:
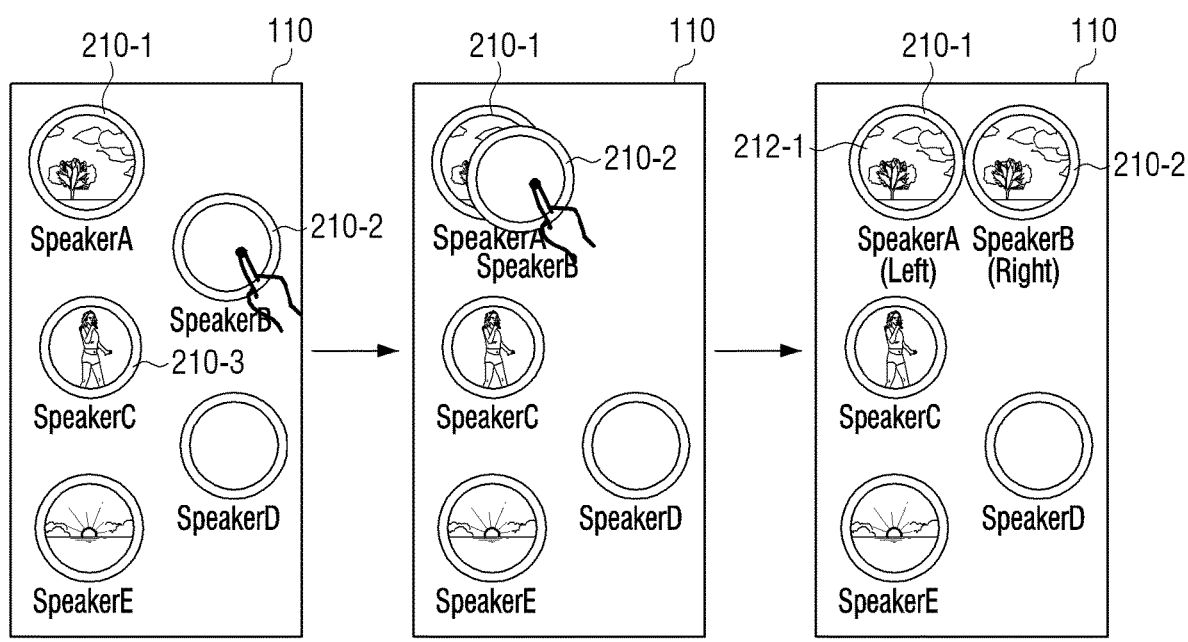
FIGS. 6A-6C are views provided to explain a stereo function according to various exemplary embodiments.
Figure 6B:
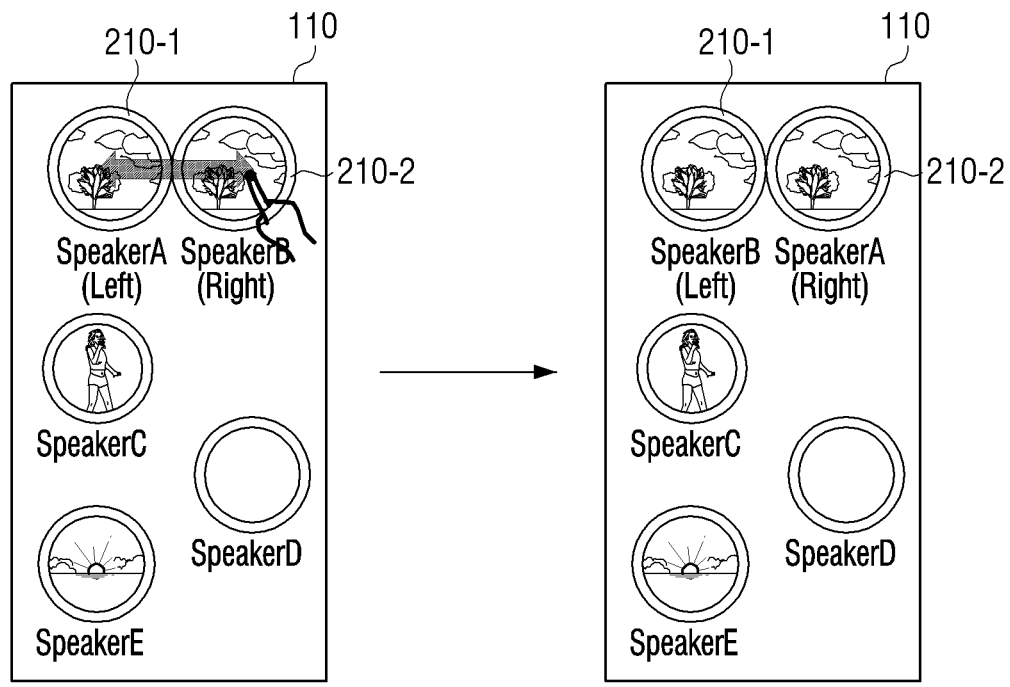
Figure 6C:
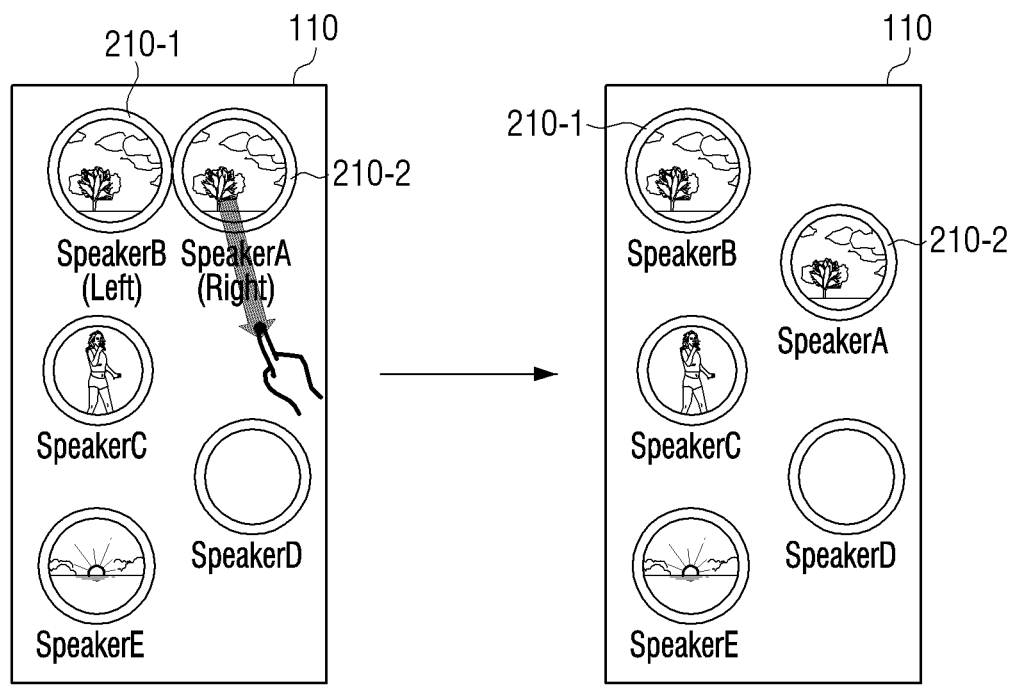

FIGS. 6A-6C are views provided to explain a stereo function according to various exemplary embodiments.

FIG. 6A is a view for setting a stereo function according to an exemplary embodiment. Referring to FIG. 6A, if an interaction of dragging the second GUI 210-2 corresponding to the second speaker 200-2 and dropping the second GUI 210-2 at a location where the first GUI 210-1 corresponding to the first speaker 200-1 is displayed is input, a plurality of channel signals constituting the content output from the first speaker 200-1 may perform a stereo function output from the first speaker 200-1 and the second speaker 200-2. However, this is only an example, and a plurality of channel signals constituting the content output from the second speaker 200-2 may be output from the first speaker 200-1 and the second speaker 200-2, respectively. If a stereo function is set, the processor 130 may display the information 212-1 regarding the same contents on the first GUI 210-1 and the second GUI 210-2.

The interaction of dragging a GUI may be an interaction of touching the GUI for more than a predetermined time and moving the GUI by changing the touch point. If the GUI is touched for more than a predetermined time, the processor 130 may indicate that dragging is possible through the display of vibrating the GUI. However, this is only an example, the color of the GUI may be changed. In addition, the dragging interaction may be not only an interaction of touching for more than a predetermined time but also an interaction of touching the GUI using two fingers.

If a drag-and-drop interaction is input, the processor 130 may dispose the first GUI 210-1 and the second GUI 210-2 to be adjacent to each other. A user may recognize that a plurality of speakers corresponding to each of a plurality of GUIs perform a stereo function through the display screen where the plurality of GUIs are disposed to be adjacent to each other. However, this is only an example, and parts of the GUIs may be overlapped with each other.

Meanwhile, if a drag-and-drop interaction is input several times, the processor 130 may transmit a control signal so that a plurality of channel signals constituting a content output from one of a plurality of speakers are output from each of the plurality of speakers corresponding to each of a plurality of GUIs. For example, if a drag-and-drop interaction is input by a user two times, the processor 130 control a plurality of channel signals constituting a content output from one of the three speakers selected by the user to be output from each of the plurality of speakers.

Meanwhile, the processor 130 may control to divide a plurality of channel signals based on the location of a GUI which is disposed on the display 110 and output the signals. For example, if a drag-and-drop interaction is input once, two speakers may perform a stereo function. In this case, the processor 130 may transmit a control signal such that the first GUI 210-1 displayed on the left side of the display 110 between the first GUI 210-1 and the second GUI 210-2 corresponding to the two speakers outputs the signal of a left channel, and transmit a control signal such that the second GUI 210-2 display 210-2 displayed on the right side of the display 110 outputs the signal of a right channel. However, this is only an example, and the direction may be changed when transmitting a control signal.

FIG. 6B is a view for changing a stereo function according to another exemplary embodiment. Referring to FIG. 6B, if a drag-and-drop interaction for changing the locations of the first GUI 210-1 and the second GUI 210-2 is input while a stereo function is set for the first speaker 200-1 and the second speaker 200-2, the processor 130 may switch between channel signals output from the first speaker 200-1 and the second speaker 200-2 and output the signals.

FIG. 6B is a view for explaining that a stereo function is performed in two speakers, but this is only an example. The stereo function may be performed by combining speakers in various ways.

Meanwhile, if there exists only a left channel signal and a right channel signal in a content which is output, and there are three speakers to perform the stereo function, one speaker may not output any content. However, this is only an example, and one of the left channel signal and the right channel signal may be output through two speakers.

In this case, the processor 130 may display the three speakers to be adjacent to each other, and if any one speaker does not output a content, the information regarding the content displayed on the corresponding GUI may be displayed differently from the information regarding a content displayed in the other GUIs. For example, in a speaker which does not output any content, the information regarding a content displayed on a GUI may be displayed in grayscale. However, this is only an example, and only the information regarding a content may not be displayed while the GUIs are disposed in adjacent to each other.

FIG. 6C is a view for releasing a stereo function according to another exemplary embodiment. Referring to FIG. 6C, if the first GUI 210-1 and the second GUI 210-2 are spaced apart for more than a predetermined distance as a result of an interaction of moving at least one of the first GUI 210-1 and the second GUI 210-2, the processor 130 may control to release the stereo function.

The processor 130 may control the speaker corresponding to the GUI where the stereo function is released to output a content which has been output continuously. However, the processor 130 may control to output all channel signals, instead of a part of the channel signals, of the content which has been output. If the stereo function is set for two speakers and the stereo function is later released, the processor 130 may control so that both of the two speakers output all channel signals, instead of a part of the channel signals, of the content which has been output. However, if the stereo function is set for more than three speakers and the stereo function is released for one of the speakers, the processor 130 may control so that channel signals are divided and output with respect to a plurality of speakers where the stereo function is maintained.

Figure 7:
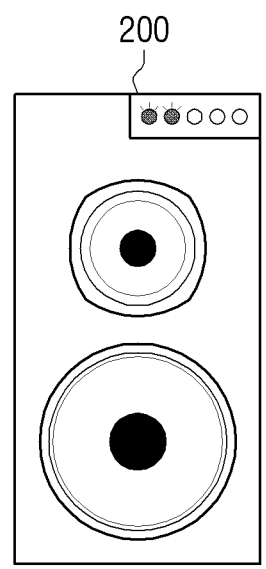
FIG. 7 is a view provided to explain providing of a feedback from a speaker according to an exemplary embodiment.

FIG. 7 is a view provided to explain providing of a feedback from a speaker according to an exemplary embodiment.

Referring to FIG. 7, if a touch interaction is input with respect to at least one of a plurality of GUIs, the processor 130 may control a speaker 200 corresponding to the GUI where the touch interaction is input.

For example, if a drag-and-drop interaction to perform the stereo function with another speaker is input, the processor 130 may control the speaker 200 where the stereo function is set to display that the stereo function is currently performed while transmitting a control signal to perform the stereo function. For example, the processor 130 of FIG. 7 may transmit a control signal to turn two LEDs on to indicate that the stereo function is set. However, this is only an example, and a display instead of an LED may be provided.

Figure 8A:
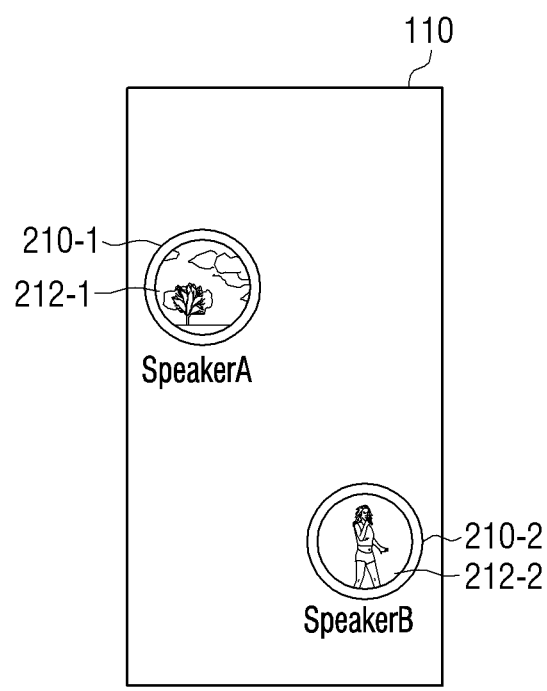
FIGS. 8A-8F are views provided to explain changing of a GUI according to an exemplary embodiment.
Figure 8B:
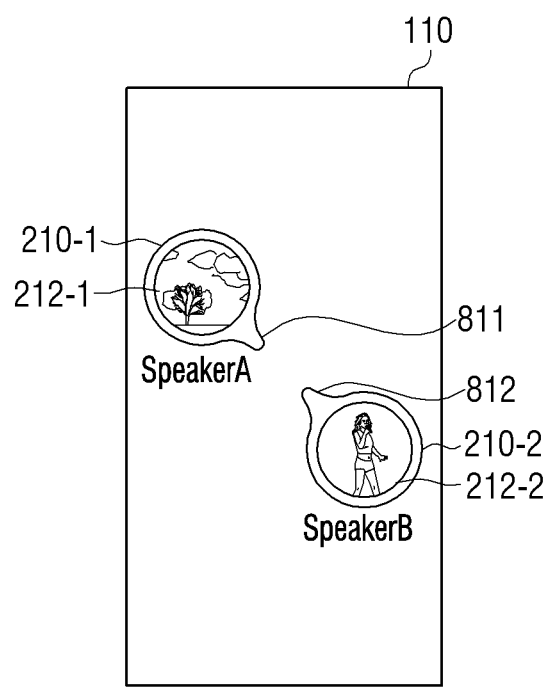
Figure 8C:
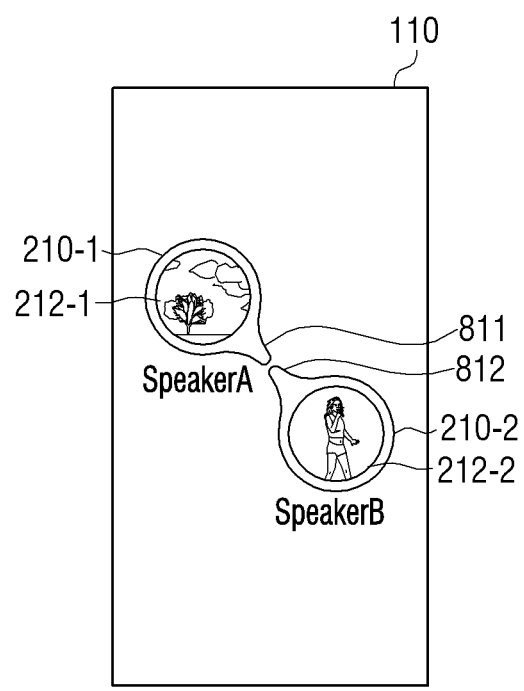
Figure 8D:
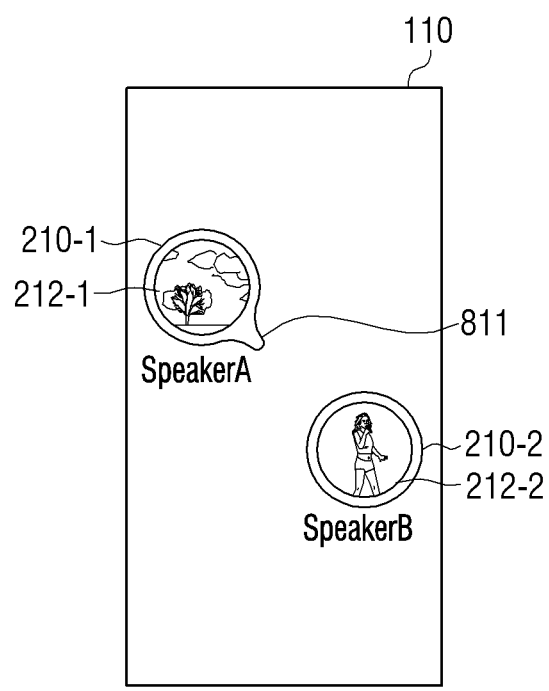
Figure 8E:
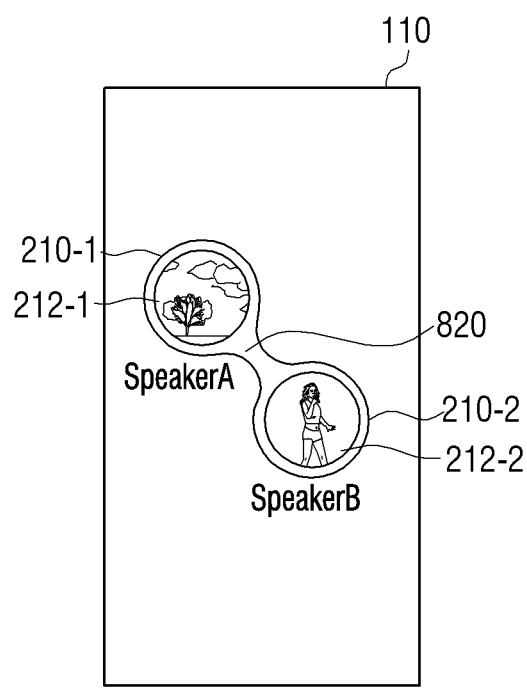
Figure 8F:
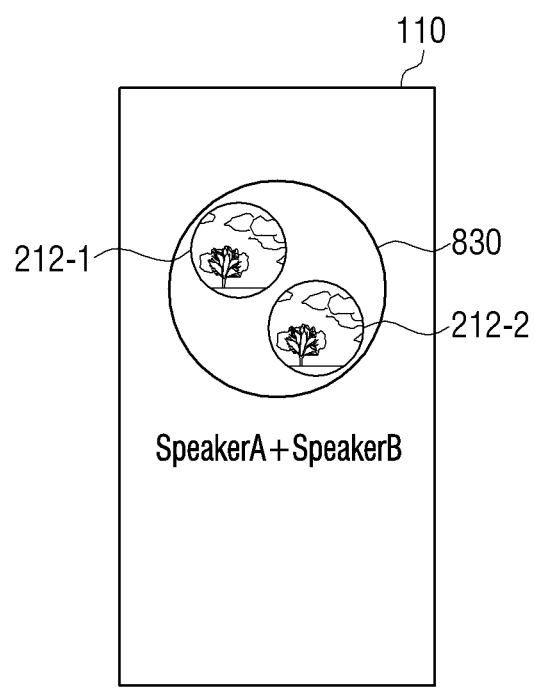

FIGS. 8E-F are views provided to explain changing a GUI according to an exemplary embodiment.

According to FIG. 8A, the processor 130 may display a first GUI 210-1 corresponding to a first speaker 200-1, and a second GUI 210-2 corresponding to a second speaker 200-2 on the display 110. According to FIG. 8A, the first GUI 210-1 and the second GUI 210-2 are displayed only, but this is merely exemplary.

The processor 130 may display so that the first GUI 210-1 and the second GUI 210-2 are apart from each other at a distance greater than a predetermined distance, and this is to indicate the state that the animation effect which will be described later is not provided.

As shown in FIG. 8B, the processor 130 may, in response to a user input, control to move at least one of the first GUI 210-1 corresponding to the first speaker 200-1 and the second GUI 210-2 corresponding to the second speaker 200-2. If distance between the first GUI 210-1 and the second GUI 210-2 becomes less than a predetermined first threshold distance, there may be provided an animation effect to change a shape of the first GUI 210-1 and the second GUI 210-2.

As described above, a user input may be a swipe interaction on one GUI, a touch interaction, a drag-and-drop interaction, and a multi touch interaction to touch a plurality of GUIs. In addition, a user input may be an interaction to widen or shorten distance between two GUIs by touching them with separate fingers.

Hereinbelow, it will be explained that the animation effect is an effect to be provided based on distance between a plurality of GUIs rather than a type of a user interaction. In other words, even if there is a user interaction, if there is no change in distance among a plurality of GUIs, an animation effect may not be provided. Meanwhile, the embodiment is not limited thereto, and the configuration that an animation effect is provided when there is a specific interaction of a user is also available. For example, an animation effect can be provided only when distance among a plurality of GUIs is less than a preset first threshold distance according to a drag-and-drop interaction.

As described above, each of the first GUI 210-1 and the second GUI 210-2 may include information on contents which are output. Hereinbelow, information on contents which are output is described as an information display area, and it will be described that each GUI includes an information display area and an edge area surrounding the information display area.

The processor 130, when distance between the first GUI 210-1 and the second GUI 210-2 is less than a preset first threshold distance, may provide a visual feedback that an edge area of each of the first GUI 210-1 and the second GUI 210-2 is extended toward an area between the first GUI 210-1 and the second GUI 210-2.

In FIG. 8B, the processor 130 may extend a part 811 of an edge area adjacent to the second GUI 210-2, from among edge areas of the first GUI 210-1, toward the direction of the second GUI 210-2. Likewise, the processor 130 may extend a part 812 of the edge areas adjacent to the first GUI 210-1 from among the edge areas of the second GUI 210-2 toward a direction of the first GUI 210-1.

FIG. 8C illustrates the case where distance between the first GUI 210-1 and the second GUI 210-2 is shorter than the case of FIG. 8B. The processor 130 may determine length for extension of the parts 811, 812 of the edge areas based on distance between the first GUI 210-1 and the second GUI 210-2. For example, the processor 130, compared to the case where distance between the first GUI 210-1 and the second GUI 210-2 is 3 cm, can extend longer the parts 811, 812 of the edge areas when the case where distance is 2 cm. In other words, the processor 130 may extend longer the parts 811, 812 of the edge areas when the distance between the first GUI 210-1 and the second GUI 210-2 is shorter. On the other hand, the processor 130 may make a part 811, 812 of the edge areas when distance between the first GUI 210-1 and the second GUI 210-2 is longer.

Meanwhile, the embodiment is not limited thereto, and for example, the processor 130 may divide distance between the first GUI 210-1 and the second GUI 210-2 into three portions, and enable that there is no change in GUI in the first portion, a GUI is extended based on distance in the second portion as described above, and the extended GUI is not further changed in the third portion.

Meanwhile, it has been described that a part of edge areas is extended or becomes shorter according to distance between the first GUI 210-1 and the second GUI 210-2, but the embodiment is not limited thereto. For example, another area other than the parts 811, 812 of the edge areas can be changed. In addition, color can be changed instead of shape, and a new GUI can be overlapped and displayed.

In addition, as illustrated in FIGS. 8B and 8C, extension in a streamlined shape is merely an exemplary embodiment, and shape can be changed to various shapes. For example, a part 811, 812 of the edge areas is extended, an end part can be displayed sharply.

According to FIG. 8D, the processor 130, when there is only an interaction to move the first GUI 210-1 only, may extend a part 811 of the edge areas of the first GUI 210-1 without changing the edge areas of the second GUI 210-2. But, the embodiment is not limited thereto, and for example, if there is an interaction to move all the first GUI 210-1 and the second GUI 210-2, when moving velocity is different from each other, the processor 130 can change a shape of one GUI of which the moving velocity is faster. Or, the processor 130 can recognize a position of a user and change a shape of the GUI which gets closer to the GUI without changing a shape of GUI corresponding to a speaker adjacent to a user.

In addition, the processor 130 may determine a speaker corresponding to a GUI whose shape is not changing as a reference speaker. When the first speaker 200-1 and the second speaker 200-2 are interlocked, the contents which are reproduced in the reference speaker can be reproduced at a speaker which is not a reference speaker. Meanwhile, the above is merely exemplary, and the processor 130 may change a speaker which corresponds to a GUI with change in a shape as a reference speaker.

According to FIG. 8E, the processor 130, when distance between the first GUI 210-1 and the second GUI 210-2 is less than a second threshold distance, can provide a feedback to connect the extended edge areas with each other. Here, the second threshold distance can be shorter than the first threshold distance.

The processor 130, in proportion to distance between the first GUI 210-1 and the second GUI 210-2 getting shorter, may extend a part 811, 812 of the edge areas, and if parts 811, 812 of the edge areas face with each other, can connect parts 811, 812 of the edge areas and generate a connected area 820. In addition, the processor 130, if color of the parts 811, 812 of the edge areas is different, can change color of the connected area 820 in the same manner while the parts 811, 812 of the edge areas are connected with each other.

The processor 130 may apply gradation from color of the connected area 820 to each color of the edge areas of the first GUI 210-1 and the second GUI 210-2 and display the same.

The processor 130, when parts 811, 812 of the edge areas of each of the first GUI 210-1 and the second GUI 210-2 are connected, even if there is no touch interaction from a user, can make the first GUI 210-1 and the second GUI 210-2 get closer. In addition, the processor 130 can generate a group GUI to be described later. Meanwhile, this is merely an exemplary embodiment, and if there is not a user's touch interaction, the configuration that the positions of the first GUI 210-1 and the second GUI 210-2 do not move any more can be also possible.

According to FIG. 8F, the processor 130, when distance among the first GUI 210-1 and the second GUI 210-2 is less than a third threshold distance, the edge areas of the first GUI 210-1 and the second GUI 210-2 may be combined to one area, and a visual feedback to surround information display areas including information 212-1, 212-2 of each of the first GUI 210-1 and the second GUI 210-2 can be provided. Here, the third threshold distance can be shorter than the second threshold distance.

The processor 130, when distance between the first GUI 210-1 and the second GUI 210-2 is less than the third threshold distance, may display one group GUI 830 while the edge areas of the first GUI 210-1 and the second GUI 210-2 are combined into one area. The group GUI 830 may include the information display areas 212-1, 212-2 of each of the first GUI 210-1 and the second GUI 210-2.

The processor 130 may determine color of the group GUI 830 with middle color of the edge areas of each of the first GUI 210-1 and the second GUI 210-2. In addition, the processor 130 can make color of the group GUI 830 to be the same as the connected area 820 of FIG. 8E. Meanwhile, this is merely exemplary, and the processor 130 can determine color of the group GUI 830 with one color of the first GUI 210-1 and the second GUI 210-2 or decide color randomly.

The processor 130, while the group GUI 830 is displayed, can interlock the operations of the first speaker 200-1 and the second speaker 200-2. The processor 130, as described above, may execute grouping function to interlock output of the first speaker 200-1 and the second speaker 200-2, and control the first speaker 200-1 and the second speaker 200-2. Or, the processor 130 may execute stereo function that a plurality of channel signals constituting the contents are output respectively from the first speaker 200-1 and the second speaker 200-2 and control the first speaker 200-1 and the second speaker 200-2. But, the embodiment is not limited thereto, and various functions related to the operations of the first speaker 200-1 and the second speaker 200-2 can be performed.

The processor 130, while interlocking the operations of the first speaker 200-1 and the second speaker 200-2, may display the information display areas including information 212-1, 212-2 of each of the first GUI 210-1 and the second GUI 210-2 in the same manner. At this time, the processor 130 may display information on one content from among the contents reproduced in the first GUI 210-1 and the second GUI 210-2 to the information display areas including information 212-1, 212-2.

The processor 130 may determine a GUI with a shorter moving distance as a reference GUI out of the first GUI 210-1 and the second GUI 210-2, and control that the contents reproduced in the reference GUI are reproduced in the first speaker 200-1 and the second speaker 200-2. In addition, the processor 130 may display information on the contents reproduced in the reference GUI to the information display areas 212-1, 212-2. However, this is merely exemplary, and the processor 130 may determine a GUI with a greater moving distance as a reference GUI. Or, the processor 130 may determine the reference GUI based on moving velocity.

In addition, the processor 130 may determine a reference GUI based on a criteria which is not a moving distance of the GUI. For example, the processor 130 can determine a GUI corresponding to a speaker as a reference GUI by determining a speaker frequently used or designated by a user as a reference speaker or a speaker located adjacent to a user as a reference speaker.

The processor 130, according to an interaction to move at least one of the information display areas 212-1, 212-2, when at least one of the information display areas 212-1, 212-2 is located distant from the group GUI 830, can divide the group GUI 830 and display the first GUI 210-1 and the second GUI 210-2.

The processor 130, when a group GUI 830 is separated and the first GUI 210-1 and the second GUI 210-2 are displayed, can control to reproduce the contents which have been reproduced in each speaker before interlocking of the operations of the first GUI 210-1 and the second GUI 210-2. However, the above is merely an exemplary embodiment, and the contents which have been reproduced while operations of the first GUI 210-1 and the second GUI 210-2 are interlocked can be continued to be reproduced.

Figure 9:
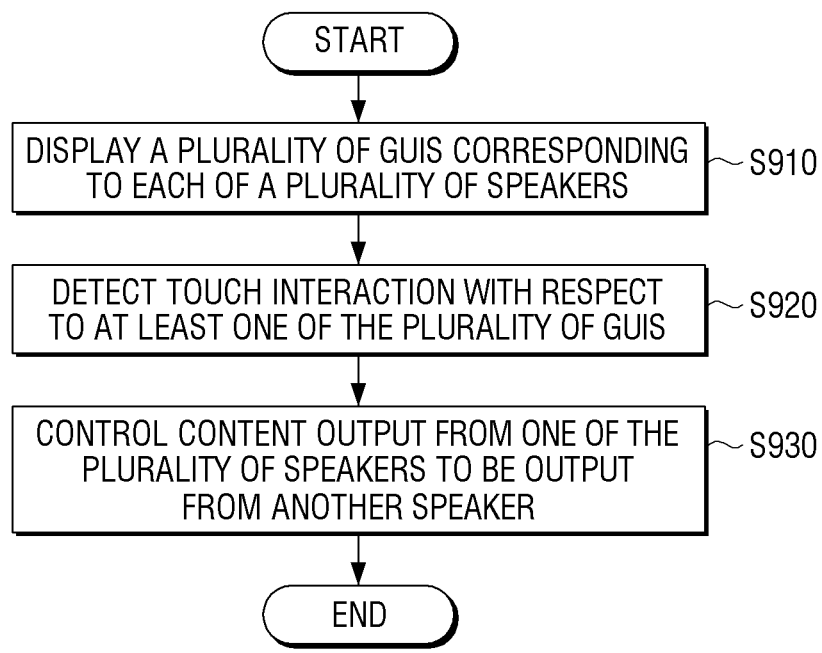
FIG. 9 is a view provided to explain a method of controlling a display apparatus according to an exemplary embodiment.

FIG. 9 is a view provided to explain a method of controlling the display apparatus 100 according to an exemplary embodiment.

Referring to FIG. 9, the display apparatus 100 displays a plurality of GUIs corresponding to each of a plurality of speakers (S910). The plurality of speakers may be set by a user, but speakers which can communicate with the display apparatus 100 may be detected automatically.

Subsequently, the display apparatus 100 detects an input of a touch direction with respect to at least one of a plurality of GUIs (S920). The touch interaction includes various interactions such as swipe interaction, touch interaction for grouping, drag-and-drop interaction, etc.

The display apparatus 100 controls a content output from one of a plurality of speakers to be output from another speaker (S930).

In addition, the step of controlling (S930) may include, in response to a swipe interaction in the direction of the second GUI 210-2 corresponding to the second speaker 200-2 from the direction of the first GUI 210-1 corresponding to the first speaker 200-1, controlling a content output from the first speaker 200-1 to be output from the second speaker 200-2.

The controlling may further include the step of displaying information displayed on the first GUI 210-1 on the second GUI 210-2 according to a swipe interaction.

In addition, the step of controlling (S930) may include, in response to a touch interaction for grouping from the first GUI 10 corresponding to the first speaker 200-1 to the second GUI 210-2 corresponding to the second speaker 200-2, controlling to perform grouping of interlocking the output of the first speaker 200-1 and the second speaker 200-2.

As such, according to the various exemplary embodiments, the display apparatus 100 may display a plurality of GUIs corresponding to a plurality of speakers which can be communicated and control each of the plurality of speakers based on a touch interaction with respect to the plurality of GUIs, thereby improving user convenience.

Meanwhile, the methods according to such various exemplary embodiments may be programmed and stored in various storage media. Accordingly, the methods according to the various exemplary embodiments may be realized in various types of electronic apparatuses which execute the storage media.

Specifically, according to an exemplary embodiment, a non-transitory computer readable medium storing a program which performs the steps of displaying a plurality of GUIs corresponding to each of a plurality of speakers and controlling a content output from one of the plurality of speakers to be output from another speaker according to a touch interaction with respect to at least one of the plurality of GUIs sequentially may be provided.

The non-transitory recordable medium refers to a medium which may store data semi-permanently rather than storing data for a short time, such as register, cache, memory, etc. and is readable by an apparatus. Specifically, the above-described various applications and programs may be stored and provided in a non-transitory recordable medium such as CD, DVD, hard disk, Blu-ray disk, USB, memory card, ROM, etc.

The foregoing embodiments and advantages are merely exemplary and are not to be construed as limiting. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus, comprising:
   a display;
   a communicator; and
   a processor configured to:
   control the display to display a plurality of graphical user interface (GUI) items, the plurality of GUI items including a first GUI item indicating a first external speaker and including a first name of the first external speaker, and a second GUI item indicating a second external speaker and including a second name of the second external speaker, and
   based on a touch interaction of dragging an entirety of the first GUI item to the second GUI item being detected while an audio content is output at the first external speaker and information related to the audio content is displayed on the first GUI item, control the communicator to transmit a control signal to the second external speaker to output the audio content at the second external speaker and control the display to display the information related to the audio content on the second GUI item while displaying the information related to the audio content on the first GUI item,
   wherein the processor, based on an interaction to move at least one of the first GUI item corresponding to the first external speaker and the second GUI item corresponding to the second external speaker being input on the display, and a distance between the first GUI item and the second GUI item being less than a predetermined first threshold distance, is configured to control the display to provide an animation effect to change a shape of the first GUI item and the second GUI item,
   wherein the first GUI item includes a first information display area and a first edge area surrounding the first information display area and the second GUI item includes a second information display area and a second edge area surrounding the second information display area, and
   wherein the processor, based on the distance between the first GUI item and the second GUI item being less than the predetermined first threshold distance, is configured to provide a visual feedback that is the first edge area and the second edge area are extended in a direction toward a center point between the first GUI item and the second GUI item.

2. The apparatus as claimed in claim 1, wherein the processor, based on a swipe interaction being input on the display, the swipe interaction beginning at a first location on the display of the first GUI item corresponding to the first external speaker, and the swipe interaction moving toward a second location on the display of the second GUI item corresponding to the second external speaker, is configured to control a content output from the first external speaker to be output from the second external speaker.

3. The apparatus as claimed in claim 2, wherein, based on the swipe interaction, the processor controls the second GUI item to display information that is displayed in the first GUI item.

4. The apparatus as claimed in claim 1, wherein the processor, based on a touch interaction for grouping being input on the display, the touch interaction for grouping beginning at a first location on the display of the first GUI item corresponding to the first external speaker and the touch interaction for grouping moving toward a second location on the display of the second GUI item corresponding to the second external speaker, is configured to control to perform a grouping function of linking first output of the first external speaker to second output of the second external speaker.

5. The apparatus as claimed in claim 4, wherein the processor, based on the touch interaction for grouping being input, is configured to control the display to display a third GUI item which provides a visual feedback indicating that the first GUI item and the second GUI item are connected.

6. The apparatus as claimed in claim 5, wherein the processor, based on an interaction of moving at least one of the first GUI item and the second GUI item being input on the display while the first GUI item and the second GUI item are grouped, is configured to control to release the grouping function, and to remove the third GUI item.

7. The apparatus as claimed in claim 1, wherein the processor, based on an interaction of dragging being input on the display, the interaction of dragging beginning at a first location of the first GUI item corresponding to the first external speaker and dropping the first GUI item on a second location where the second GUI item corresponding to the second external speaker is displayed, is configured to control to perform a stereo function where a plurality of channel signals constituting a content output from the second external speaker are output from the first external speaker and the second external speaker, wherein the plurality of channel signals includes a first channel signal output from the first external speaker and a second channel signal output from the second external speaker.

8. The apparatus as claimed in claim 7, wherein the processor, based on a drag and drop interaction being input on the display, is configured to control the first GUI item and the second GUI item to be disposed adjacent to each other.

9. The apparatus as claimed in claim 8, wherein the processor, based on the drag and drop interaction being input on the display, the drag and drop interaction including switching the first location of the first GUI item with the second location of the second GUI item, is configured to control to switch the first channel signals output from the first external speaker with the second channel signal output from the second external speaker.

10. The apparatus as claimed in claim 8, wherein the processor, based on an interaction of moving being input on the display, the interaction of moving causing the first GUI item and the second GUI item being spaced apart at more than a predetermined interval, is configured to control to release the stereo function.

11. The apparatus as claimed in claim 1, wherein the processor, based on the distance between the first GUI item and the second GUI item being less than a second threshold distance, is configured to provide a visual feedback that the first edge area is connected with the second edge area.

12. The apparatus as claimed in claim 11, wherein the processor, based on the distance between the first GUI item and the second GUI item being less than a third threshold distance, is configured to provide a visual feedback to replace the first edge area and the second edge area with a combined edge area, and to replace the first information display area and the second information display area with a combined information display area surrounding the first GUI item and the second GUI item.

13. The apparatus as claimed in claim 1, wherein each of the plurality of GUI items includes information regarding a content output from a corresponding speaker.

14. The apparatus as claimed in claim 1, wherein the processor, based on the touch interaction being input on the display, is configured to control to provide a predetermined feedback from a speaker corresponding to the first GUI item.

15. A method of controlling a display apparatus which communicates with a plurality of speakers, the method comprising:
    displaying on a display a plurality of graphical user interface (GUI) items corresponding to the plurality of speakers, the plurality of GUI items including a first GUI item indicating a first external speaker of the plurality of speakers and including a first name of the first external speaker, and a second GUI item indicating a second external speaker of the plurality of speakers and including a second name of the second external speaker; and
    based on a touch interaction of dragging an entirety of the first GUI item to the second GUI item being detected while an audio content is output at the first external speaker and information related to the audio content is displayed on the first GUI item, transmitting a control signal to the second external speaker to output the audio content at the second external speaker and displaying the information related to the audio content on the second GUI item while displaying the information related to the audio content on the first GUI item,
    wherein, based on an interaction to move at least one of the first GUI item corresponding to the first external speaker and the second GUI item corresponding to the second external speaker being input on the display, and a distance between the first GUI item and the second GUI item being less than a predetermined first threshold distance, an animation effect is provided to change a shape of the first GUI item and the second GUI item,
    wherein the first GUI item includes a first information display area and a first edge area surrounding the first information display area and the second GUI item includes a second information display area and a second edge area surrounding the second information display area, and
    wherein, based on the distance between the first GUI item and the second GUI item being less than the predetermined first threshold distance, a visual feedback is provided wherein the first edge area and the second edge area are extended in a direction toward a center point between the first GUI item and the second GUI item.

16. A method for controlling a plurality of speakers, the method comprising:
    displaying, on a display, a plurality of icons, the plurality of icons including a first icon and a second icon;
    associating the first icon with a first external speaker of the plurality of speakers, and the second icon with a second external speaker of the plurality of speakers such that the first icon indicates the first external speaker and includes a first name of the first external speaker and the second icon indicates the second external speaker and includes a second name of the second external speaker;
    receiving, at the display, a touch interaction of dragging an entirety of the first icon to the second icon while an audio content is output at the first external speaker corresponding to the first icon and information related to the audio content is displayed on the first icon;
    transmitting a control signal to the second external speaker to output the audio content at the second external speaker corresponding to the second icon based on the touch interaction; and
    displaying the information related to the audio content on the second icon while displaying the information related to the audio content on the first GUI itemicon,
    wherein, based on an interaction to move at least one of the first icon corresponding to the first external speaker and the second icon corresponding to the second external speaker being input on the display, and a distance between the first icon and the second icon being less than a predetermined first threshold distance, an animation effect is provided to change a shape of the first icon and the second icon,
    wherein the first icon includes a first information display area and a first edge area surrounding the first information display area and the second icon includes a second information display area and a second edge area surrounding the second information display area, and
    wherein, based on the distance between the first icon and the second icon being less than the predetermined first threshold distance, a visual feedback is provided wherein the first edge area and the second edge area are extended in a direction toward a center point between the first icon and the second icon.

17. The method of claim 16, wherein:
the touch interaction of dragging the entirety of the first icon to the second icon is a swipe input that moves the first icon toward the second icon, and
the transmitting the control signal to the second external speaker corresponding to the second icon further comprises controlling the second speaker to output the audio content.

18. The method of claim 16, wherein:
the touch interaction of dragging the entirety of the first icon to the second icon is a grouping input that establishes a group including the first icon and the second icon, and
the transmitting the control signal to the second external speaker corresponding to the second icon further comprises controlling a first output and a second output to be linked.

* * * * *